United States Patent
Pethe et al.

(10) Patent No.: US 9,710,406 B2
(45) Date of Patent: Jul. 18, 2017

(54) DATA TRANSMISSION USING PCIE PROTOCOL VIA USB PORT

(71) Applicant: Intel Corporation, Santa Clara, CA (US)

(72) Inventors: Akshay G. Pethe, Hillsboro, OR (US); David J. Harriman, Portland, OR (US); Mahesh Wagh, Portland, OR (US); Abdul Hawk Ismail, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 289 days.

(21) Appl. No.: 14/570,304

(22) Filed: Dec. 15, 2014

(65) Prior Publication Data

US 2016/0170929 A1    Jun. 16, 2016

(51) Int. Cl.
*G06F 13/38* (2006.01)
*G06F 13/10* (2006.01)
(Continued)

(52) U.S. Cl.
CPC ............ *G06F 13/102* (2013.01); *G06F 1/266* (2013.01); *G06F 13/287* (2013.01);
(Continued)

(58) Field of Classification Search
CPC .......... G06F 13/387; G06F 2213/0026; G06F 2213/0042; G06F 13/4022; G06F 13/4221; G06F 13/4282
See application file for complete search history.

(56) References Cited

U.S. PATENT DOCUMENTS

| 5,396,376 A | 3/1995 | Chambors et al. |
| 6,009,488 A | 12/1999 | Kavipurapu |

(Continued)

FOREIGN PATENT DOCUMENTS

| CN | 104350720 A | 2/2015 |
| DE | 112013001661 | 1/2015 |

(Continued)

OTHER PUBLICATIONS

International Search Report, PCT Application No. PCT/US2015/053760, mailing date Apr. 22, 2016.

(Continued)

*Primary Examiner* — Glenn A Auve
(74) *Attorney, Agent, or Firm* — International IP Law Group, P.L.L.C.

(57) ABSTRACT

Techniques for transmitted data through a USB port using a PCIe protocol are described herein. In one example, a method includes detecting a coupling of an apparatus and a PCIe compatible device via a Type-C connector and sending at least one vendor defined message to the PCIe compatible device. The method can also include receiving an alternate mode indicator corresponding to a data transfer via a PCIe protocol and sending an enter mode command to the PCIe compatible device to enable the data transfer between the apparatus and the PCIe compatible device via the PCIe protocol. Furthermore, the method can include transferring data between the apparatus and the PCIe compatible device via the Type-C connector with the PCIe protocol.

19 Claims, 4 Drawing Sheets

(51) Int. Cl.
*G06F 13/42* (2006.01)
*G06F 1/26* (2006.01)
*G06F 13/28* (2006.01)
*G06F 13/40* (2006.01)

(52) U.S. Cl.
CPC ........ *G06F 13/387* (2013.01); *G06F 13/4022* (2013.01); *G06F 13/4221* (2013.01); *G06F 13/4282* (2013.01)

(56) References Cited

U.S. PATENT DOCUMENTS

| | | | |
|---|---|---|---|
| 7,185,135 | B1 | 2/2007 | Briggs et al. |
| 7,673,092 | B2 * | 3/2010 | Zhao .................... G06F 13/409 439/291 |
| 7,769,883 | B2 | 8/2010 | Harriman |
| 7,782,805 | B1 | 8/2010 | Belhadj et al. |
| 7,934,032 | B1 | 4/2011 | Sardella et al. |
| 7,949,794 | B2 | 5/2011 | Ajanovic et al. |
| 8,218,580 | B2 | 7/2012 | Harriman |
| 8,437,343 | B1 | 5/2013 | Wagh et al. |
| 8,446,903 | B1 | 5/2013 | Ranganathan et al. |
| 8,549,205 | B1 | 10/2013 | Harriman et al. |
| 8,638,783 | B2 | 1/2014 | Wagh et al. |
| 8,737,390 | B2 | 5/2014 | Ranganathan et al. |
| 8,924,620 | B2 | 12/2014 | Harriman et al. |
| 8,972,640 | B2 | 3/2015 | Wagh |
| 2003/0229748 | A1 | 12/2003 | Brewer et al. |
| 2004/0221315 | A1 | 11/2004 | Kobayashi |
| 2005/0078614 | A1 | 4/2005 | Haartsen |
| 2006/0023633 | A1 | 2/2006 | Caruk et al. |
| 2006/0184809 | A1 | 8/2006 | Kojou et al. |
| 2006/0268936 | A1 | 11/2006 | Hong et al. |
| 2006/0294272 | A1 | 12/2006 | Chou et al. |
| 2007/0162645 | A1 | 7/2007 | Han et al. |
| 2007/0239900 | A1 | 10/2007 | Beasley et al. |
| 2008/0065796 | A1 | 3/2008 | Lee et al. |
| 2008/0065805 | A1 * | 3/2008 | Wu .......................... G06F 1/186 710/301 |
| 2008/0084836 | A1 | 4/2008 | Baird et al. |
| 2008/0109565 | A1 | 5/2008 | Ajanovic et al. |
| 2008/0233912 | A1 | 9/2008 | Hunsaker et al. |
| 2008/0235528 | A1 | 9/2008 | Kim et al. |
| 2008/0294831 | A1 | 11/2008 | Mao |
| 2009/0106476 | A1 | 4/2009 | Jenkins et al. |
| 2009/0141654 | A1 | 6/2009 | Voutilainen et al. |
| 2009/0193164 | A1 | 7/2009 | Ajanovic et al. |
| 2009/0310699 | A1 | 12/2009 | Kodama et al. |
| 2010/0014541 | A1 | 1/2010 | Harriman |
| 2010/0081406 | A1 | 4/2010 | Tan et al. |
| 2010/0278195 | A1 | 11/2010 | Wagh et al. |
| 2010/0312942 | A1 | 12/2010 | Blinick et al. |
| 2010/0325463 | A1 | 12/2010 | Lindsay |
| 2010/0332868 | A1 | 12/2010 | Tan et al. |
| 2011/0016252 | A1 * | 1/2011 | Sultenfuss .......... G06F 13/4081 710/313 |
| 2011/0016373 | A1 | 1/2011 | Teruyama et al. |
| 2011/0060931 | A1 | 3/2011 | Radhakrishnan et al. |
| 2011/0066771 | A1 | 3/2011 | Renaud et al. |
| 2011/0078483 | A1 | 3/2011 | Islam |
| 2011/0087952 | A1 | 4/2011 | Marin et al. |
| 2011/0099405 | A1 | 4/2011 | Voutilainen |
| 2011/0138096 | A1 | 6/2011 | Radulescu et al. |
| 2011/0208925 | A1 | 8/2011 | Ajanovic et al. |
| 2011/0296216 | A1 | 12/2011 | Looi et al. |
| 2012/0017016 | A1 | 1/2012 | Ma et al. |
| 2012/0079156 | A1 | 3/2012 | Safranek et al. |
| 2012/0120959 | A1 | 5/2012 | Krause |
| 2012/0191887 | A1 | 7/2012 | Yamauchi et al. |
| 2012/0246373 | A1 * | 9/2012 | Chang .................. G06F 13/409 710/301 |
| 2012/0265918 | A1 | 10/2012 | Nakajima et al. |
| 2013/0007489 | A1 | 1/2013 | Unnikrishnan et al. |
| 2013/0013842 | A1 * | 1/2013 | Numamoto ............. G06F 13/00 710/316 |
| 2013/0252543 | A1 | 9/2013 | Badi et al. |
| 2013/0262892 | A1 | 10/2013 | Radulescu |
| 2013/0346635 | A1 | 12/2013 | Morriss et al. |
| 2013/0346656 | A1 | 12/2013 | Harriman et al. |
| 2014/0032873 | A1 | 1/2014 | Ozdemir et al. |
| 2014/0108686 | A1 | 4/2014 | Wagh et al. |
| 2014/0108697 | A1 | 4/2014 | Wagh |
| 2014/0108698 | A1 | 4/2014 | Wagh et al. |
| 2014/0156875 | A1 * | 6/2014 | Saunders ............ G06F 11/3051 710/16 |
| 2014/0244869 | A1 * | 8/2014 | Adrian .................. G06F 13/385 710/106 |

FOREIGN PATENT DOCUMENTS

| | | |
|---|---|---|
| DE | 112013002639 | 2/2015 |
| KR | 10-2013-0091690 | 8/2013 |
| WO | 0172067 A1 | 9/2001 |
| WO | 2008032150 A2 | 3/2008 |
| WO | 2008154144 A1 | 12/2008 |
| WO | 2013176953 A1 | 11/2013 |
| WO | 2013176954 A2 | 11/2013 |
| WO | 2014004188 A1 | 1/2014 |

OTHER PUBLICATIONS

Harriman et al., "Providing a Serial Protocol for a Bidirectional Serial Interconnect", Utility U.S. Appl. No. 14/558,942, filed Dec. 3, 2014, pp. 1-27.
Harriman, et al., "Providing a Consolidated Sideband Communication Channel Between Devices", Utility U.S. Appl. No. 14/557,699 , filed Dec. 2, 2014, pp. 1-51.
Intel Corporation, "An Introduction to the Intel QuickPath Interconnect," Jan. 30, 2009, pp. 1-22.
Kolbehdar, et al., "The Emergence of PCI Express in the Next Generation of Mobile Platforms", Intel Technology Journal, Published Feb. 17, 2005, pp. 21-36, vol. 9 Issue 1, 16 pages.
Merrit, Rick, "Smartphone is next stop for PCI Express" from www.eetimes.com; published Sep. 13, 2012; 2 pages.
Merrit, Rick, "Spec turns USB3 into chip link", from www.eetimes.com; published May 3, 2011; 2 pages.
MIPI Alliance, "MIPI Alliance Launches New M-PHY and UniPro Specifications for Mobile Device Applications", published on Jun. 10, 2011, 1-2 pages.
MPI Alliance,"Physical Layer Specifications: MIPI Alliance Launches M-PHY v1 .0 +Uni Pro v1 .40 Specifications", 2012 (the year of publication is sufficiently earlier than the effective U.S. filing date and any foreign priority date so that the particular month of publication is not in issue in accordance with MPEP § 609.04(a)), retrieved from http://www. http://mipi.org/specifications/physical-layer. [Accessed on May 11, 2012]; 3 pages.
Murray, Matthew, "PCIe Over M-PHY May Bring High-Speed I/O to Tablets, Smartphones", from www.pcmag.com; published Sep. 13, 2012, 1 page.
Pethe et al., "Serial Sideband Signaling Link", PCT Patent Application No. PCT/US14/72389, filed on Dec. 24, 2014, pp. 1-43.
Pethe, et al., "Serial Sideband Signaling Link", My [Type] Patent Application No. PI 2014702585 , filed on Sep. 11, 2014, pp. 1-44.
Takla, et al., "M-PHY benefits and challenges", from www.eetimes.com; published Apr. 11, 2011; 8 pages.
Wagh, et al., "Optimized Link Training and Management Mechanism", Utility U.S. Appl. No. 14/109,061, filed Dec. 17, 2013,— Claims as filed on Dec. 17, 2013, pp. 1-5.
International Search Report, PCT Application No. PCT/US2014/072389, mailing date May 26, 2015, 3 pages.

* cited by examiner

400

DATA TRANSMISSION USING PCIE PROTOCOL VIA USB PORT

TECHNICAL FIELD

This disclosure relates generally to data transmission using a Peripheral Component Interconnect express (also referred to herein as PCIe) protocol and specifically, but not exclusively, to data transmission using a PCIe protocol via a USB port.

BACKGROUND

The universal serial bus (also referred to herein as USB) Type-C receptacle, plug and cable provide a smaller, thinner and more robust alternative to transmit data than using the existing USB 3.0 interconnect with standard or micro USB cables and connectors. The USB Type-C connector can be used in very thin platforms or devices, ranging from ultra-thin notebooks to hand held electronic devices, such as smart phones, where existing Standard-A and Micro-AB receptacles are deemed too large, difficult to use, or inadequately robust. In some examples, the USB Type-C receptacle may be used in very thin platforms as the total system height for the mounted USB Type-C receptacle can be less than three millimeters. Also, the USB Type-C plug can enhance ease of use by being plug-able in either upside-up or upside-down configurations. Furthermore, the USB Type-C cable enhances ease of use by being plug-able in either direction between a host device and a slave device.

BRIEF DESCRIPTION OF THE DRAWINGS

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The USB Type-C port or receptacle can enable signaling link technologies, which may have a main signaling link that can be associated with additional signals, such as sideband signals and configuration signals, which are not configured to propagate over the main signaling link. Sideband link input/output (I/O) technologies provide a way for a sideband signal to be provided from one component of a computing device to another component without being propagated on the main signaling link. In some examples, sideband signals can be transmitted along with configuration signals to indicate protocols to be used to transmit data through universal serial bus receptacles or ports.

The techniques described herein include transmitting data using a serial expansion bus protocol, such as PCIe, among others, via a USB receptacle or port. In some embodiments, a host computing device can be coupled to a slave computing device via a multi-mode connector or receptacle, such as the USB Type-C connector or receptacle, among others. The host computing device may include logic to enable data transmission through the USB receptacle using a PCIe protocol. In some embodiments, the host computing device can transmit data to a slave computing device (also referred to herein as a PCIe compatible device) through a USB Type-C port and receptacle. A USB Type-C port, as referred to herein, is a USB port associated to a USB Type-C receptacle, which can include USB signaling, configuration channel logic, multiplexers and other associated logic. A USB Type-C receptacle, as referred to herein, can include a USB receptacle conforming to the mechanical and electrical requirements of the Type-C specification.

Figure 1:
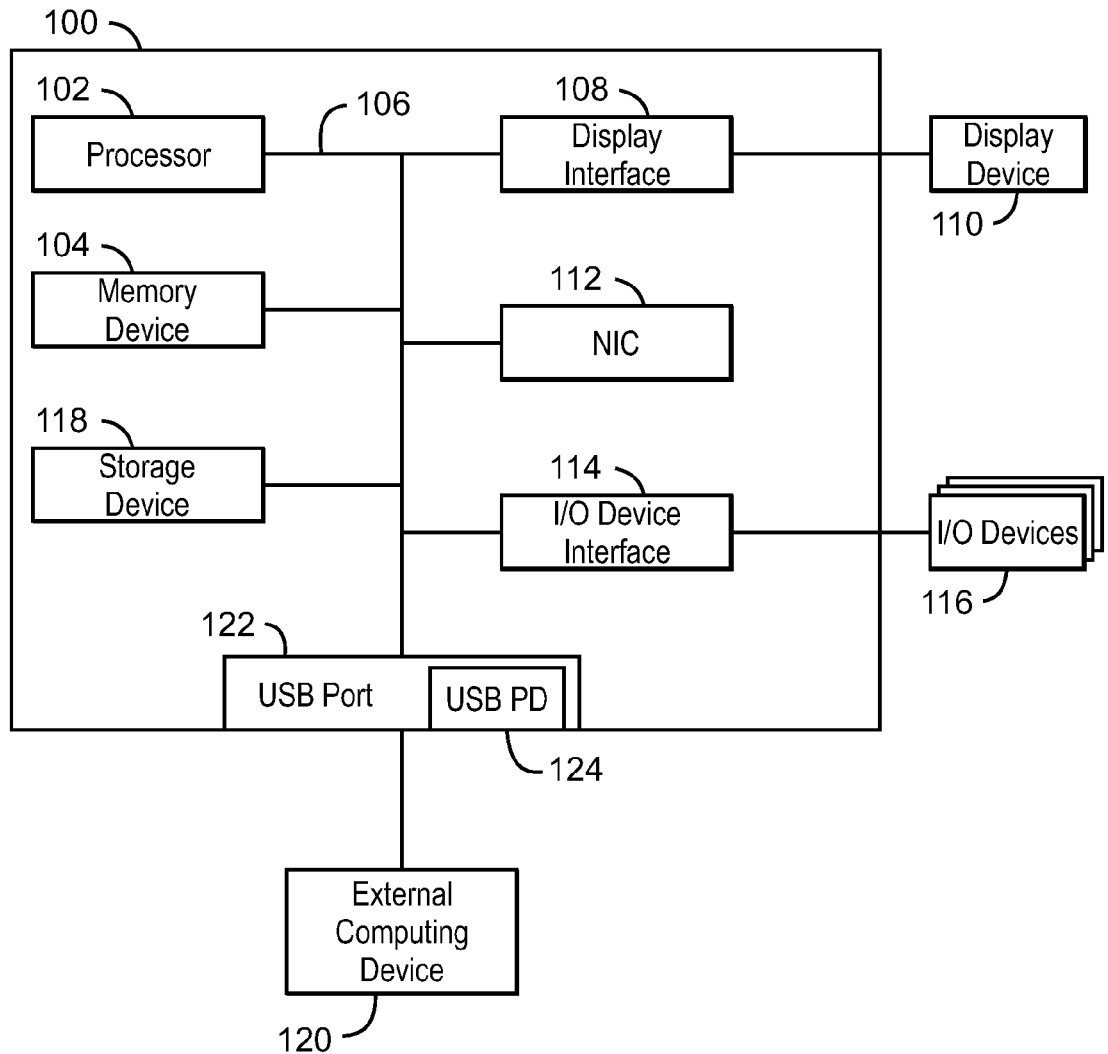
FIG. 1 illustrates a block diagram of a computing device that can transmit data using a PCIe protocol via a USB port.

FIG. 1 is a block diagram of an example of a host computing device that can transmit data using a PCIe protocol via a USB port. The host computing device 100 may be, for example, a mobile phone, laptop computer, desktop computer, or tablet computer, among others. The host computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can transmit data using a PCIe protocol via a USB port.

The processor 102 may also be linked through the system interconnect 106 (e.g., PCI®, PCI-Express®, NuBus, etc.) to a display interface 108 adapted to connect the host computing device 100 to a display device 110. The display device 110 may include a display screen that is a built-in component of the host computing device 100. The display device 110 may also include a computer monitor, television, or projector, among others, that is externally connected to the host computing device 100. In addition, a network interface controller (also referred to herein as a NIC) 112 may be adapted to connect the host computing device 100 through the system interconnect 106 to a network (not depicted). The network (not depicted) may be a cellular network, a radio network, a wide area network (WAN), a local area network (LAN), or the Internet, among others.

The processor 102 may be connected through a system interconnect 106 to an input/output (I/O) device interface 114 adapted to connect the computing host device 100 to one or more I/O devices 116. The I/O devices 116 may include, for example, a keyboard and a pointing device, wherein the pointing device may include a touchpad or a touchscreen, among others. The I/O devices 116 may be built-in components of the host computing device 100, or may be devices that are externally connected to the host computing device 100.

In some embodiments, the processor 102 may also be linked through the system interconnect 106 to a storage device 118 that can include a hard drive, an optical drive, a USB flash drive, an array of drives, or any combinations thereof. In some embodiments, the storage device 118 can include any suitable application that may attempt to transmit data to an external computing device 120. In some embodiments, the data can be transmitted from the storage device 118 to the external computing device 120 via a universal serial bus (also referred to herein as USB) port 122. The USB port 122 includes a USB power delivery module (also referred to herein as USB PD) 124 that can transmit data from the storage device 118 to the external computing device 120 using any suitable protocol supported by the external computing device 120. In some embodiments, the USB port 122 may transmit data to the external computing device 120 from any suitable component, logic, or application, among others, within the host computing device 100. In some examples, the USB PD 124 may detect that the external computing device 120 can transmit data through the USB port 120 using a PCIe protocol and initiate a data transmission using the PCIe protocol. Techniques for transmitting data through USB port 122 using a PCIe protocol are described in greater detail below in relation to FIGS. 2-4. Additionally, in some embodiments, the USB port 122 can include various components, such as multiplexors, and sideband consolidation logic, among others. The components of the USB port 122 are described in greater detail below in relation to FIGS. 2 and 3.

It is to be understood that the block diagram of FIG. 1 is not intended to indicate that the host computing device 100 is to include all of the components shown in FIG. 1. Rather, the host computing device 100 can include fewer or additional components not illustrated in FIG. 1 (e.g., additional memory components, embedded controllers, additional modules, additional network interfaces, etc.). Furthermore, any of the functionalities of the USB port 122 or USB PD 124 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the USB port 122 or USB PD 122 can be implemented with logic, wherein the logic, as referred to herein, can include any suitable hardware (e.g., a processor, among others), software (e.g., an application, among others), firmware, or any suitable combination of hardware, software, and firmware.

Figure 2:
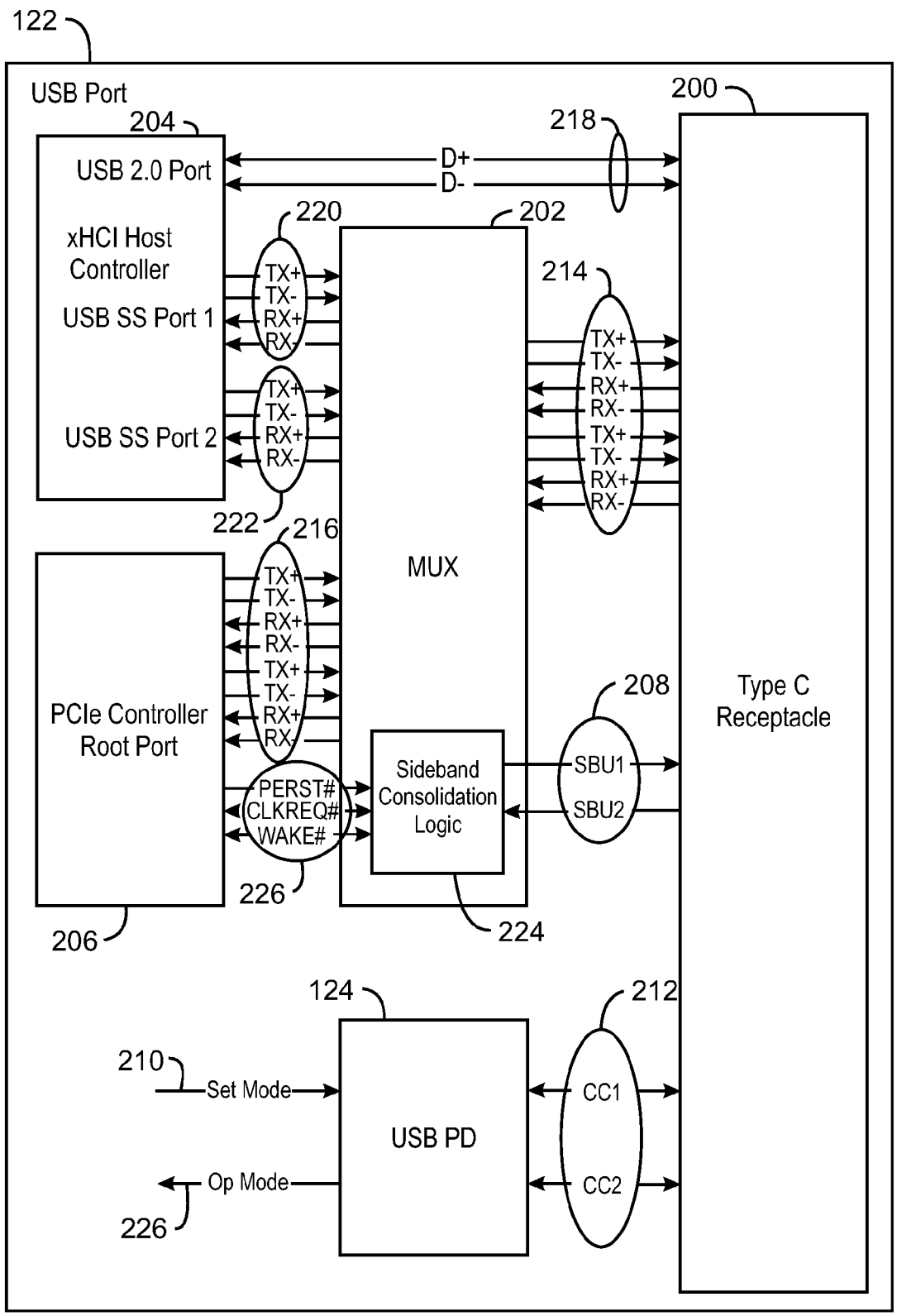
FIG. 2 illustrates a block diagram of an example of a host device with a USB port.

FIG. 2 illustrates a block diagram of an example of a host device with a USB port. In some embodiments, the USB port 122 can include a USB receptacle 200, USB Power Delivery (USB PD) logic 124, a multiplexor 202, an extensible Host Controller Interface (also referred to herein as xHCI Host Controller) 204, and a PCIe Controller Root Port 206.

In some embodiments, the USB PD 124 can detect a set mode signal 210 from the host computing device comprising the USB port 122. For example, the USB PD 124 can detect a set mode signal 210 that indicates the USB PD 124 is to attempt to transmit data with an external computing device using any suitable protocol such as PCIe, among others. In some examples, the USB PD 124 can use configuration channel signals 212, such as CC1 and CC2, to determine if an external computing device is coupled to the USB receptacle 122. A configuration channel (CC), as used herein, can be used in the discovery, configuration and management of connections across a USB Type-C cable.

In some embodiments, the USB PD 124 can detect if an external device coupled to the USB receptacle 200 can transmit data using a vendor or non-USB protocol. For example, the USB PD 124 can detect support within a host computing device for a vendor mode or protocol from the set mode signal 210. The USB PD 124 can then send, as part of a discovery process, a request or vendor defined message to the device coupled to the USB receptacle 122 to determine if the device can transmit data using the requested vendor or non-USB protocol. In some embodiments, the coupled device can respond with an acknowledgment to indicate that the coupled device can proceed with transmitting data to the USB receptacle 122 using the requested protocol or vendor mode.

In some examples, the USB PD 124 can also send a vendor defined message or request to initiate an enter mode process to begin transmitting data using a vendor or non-USB protocol such as the PCIe protocol. In some embodiments, the vendor defined message can include an alternate mode. An alternate mode, as referred to herein, includes an operation defined by a vendor or standards organization that is associated with a standard video identifier (SVID) assigned by any suitable specification such as the USB-IF specification. An alternate mode can be entered or exited by enter mode and exit mode commands included in vendor defined messages as described in greater detail below in Table 2.

The USB PD 124 can send a signal to the multiplexor 202 in response to receiving an acknowledgment from the device coupled to the USB receptacle 122 that indicates data transmission can be initiated using the PCIe protocol. In some embodiments, the signal from the USB PD 124 to the multiplexor 202 can indicate that the multiplexor 202 is to transmit data with the PCIe Controller Root Port 206 rather than the xHCI Host Controller 204. In some examples, the multiplexor 202 can transmit signals to a device coupled to the Type-C receptacle 200 using sideband channels 208 SBU1 and SBU2, which can enable clock management, and a reset, among others.

In some embodiments, the multiplexor 202 can transmit data to the device coupled to the USB receptacle (also referred to as Type-C receptacle) 200 using data lanes 214 and forward data received from data lanes 214 to the PCIe Controller Root Port 206 through data lanes 216. In some embodiments, USB PD 124 can also indicate to the multiplexor 202 that a USB protocol is to be used to transmit data with a device coupled to the USB receptacle 200. The multiplexor 202 can transmit data to the device coupled to the USB receptacle 122 using data lanes 214 or 218 and forward received data to the xHCI Host controller 204 based on the appropriate USB protocol. For example, the multiplexor 202 can forward data using a USB 3.0 protocol to the xHCI Host controller 204 using data lanes 220 or 2202 based on the USB port in the xHCI Host controller 204 that is to receive data from the multiplexor 202. In some examples, data transmitted from the USB receptacle 200 to the xHCI Host controller 204 using the USB 2.0 protocol can bypass the multiplexor 202. In some embodiments, sideband consolidation logic 224 in the multiplexor 202 can receive signals 226 from the PCIe controller root port 206, such as a PERST# signal, a CLKREQ# signal, and a WAKE# signal as a part of the consolidated sideband packet. The PERST# signal can indicate when a power supply is within a voltage tolerance range. The PERST# signal can also initialize logic, such as any suitable state machine, and reset a PCIe link or connection. The Wake# signal is an active low signal that can be transmitted by a PCIe component to reactivate a PCIe component's reference clocks and power. The WAKE# signal can be used to transition a host device to a higher power state, interrupt a host device, or to achieve a buffer flush/fill process. The CLKREQ# or clock request signal can indicate a state (e.g. high state or low state) of the clock for the USB port 122 or host computing device. The CLKREQ# signal can be used when a device exits a low power state. In some embodiments, the multiplexor 202 can continue to forward data to the xHCI Host controller 204 or the PCIe Controller Root Port 206 based on the appropriate protocol until a signal is received from the USB PD 124 indicating that an exit command has been received.

It is to be understood that the block diagram of FIG. 2 is not intended to indicate that the USB port 122 is to include all of the components shown in FIG. 2. Rather, the USB port 122 can include fewer or additional components not illustrated in FIG. 2 (e.g., additional memory components, embedded controllers, additional modules, etc.). Additionally, the USB port 122 may also execute additional instructions or techniques for transmitting data through a USB receptacle 200 using a PCIe protocol. For example, the USB PD 124 of the USB port 122 may also generate an operation mode 226 (also referred to as op mode) signal that can indicate to a host computing device that the USB port 122 is transmitting data to a slave device using a PCIe protocol.

Figure 3:
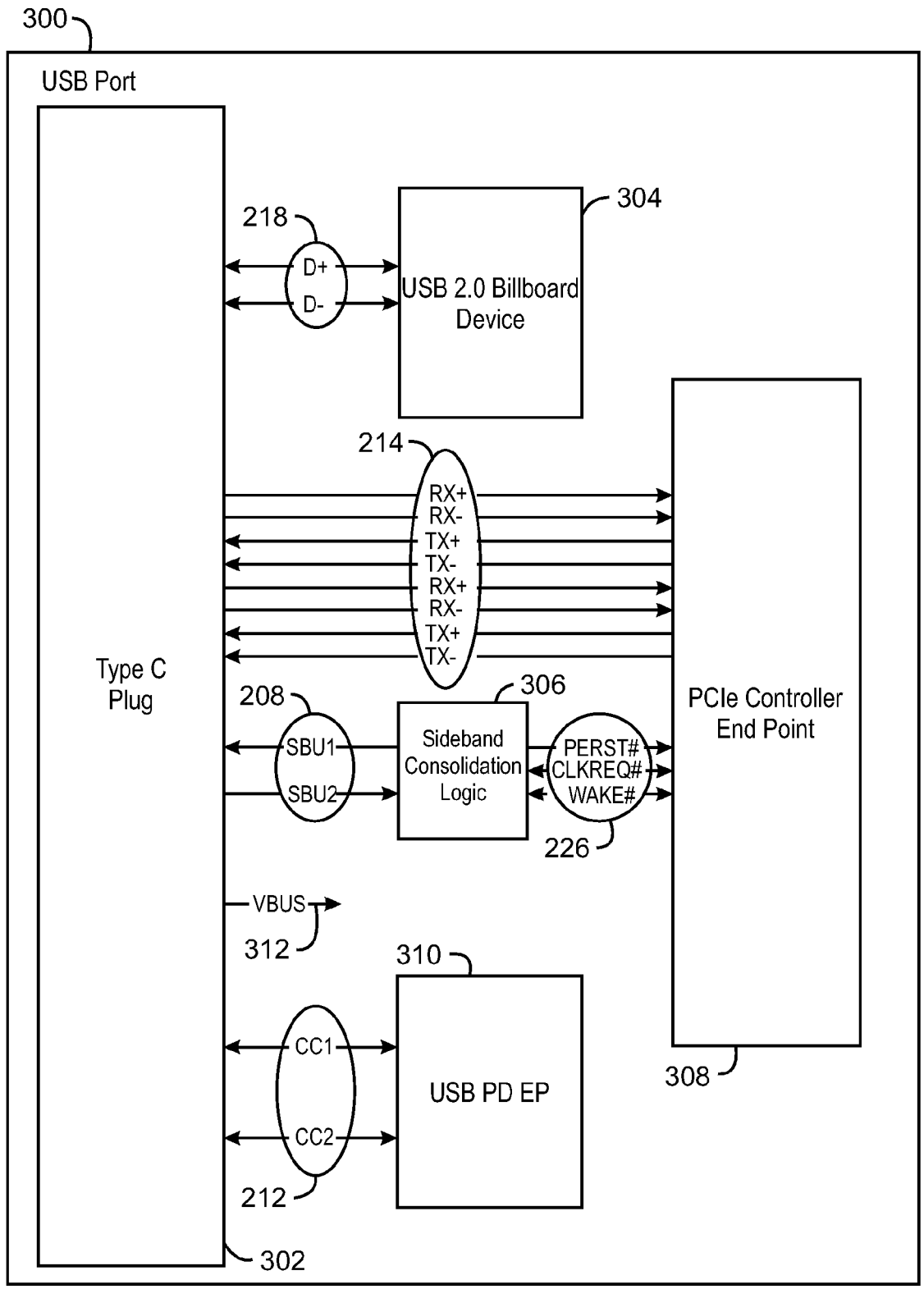
FIG. 3 illustrates a block diagram of an example of a slave device with a USB port.

FIG. 3 illustrates a block diagram of an example of a slave device with a USB port. In some embodiments, the USB port 300 can include a USB plug 302, a USB 2.0 Billboard device 304, sideband consolidation logic 306, a PCIe controller end point 308, and a USB PD End Point (also referred to herein as USB PD EP) 310.

In some examples, the USB port 300 can transmit data to a USB receptacle 122 in a host computing device using a PCIe protocol through USB plug 302. For example, the USB PD EP 310 can receive a vendor defined message from a USB PD in a host computing device. The vendor defined message may attempt to discover or identify alternate modes or interfaces that the USB port 300 supports for data transmission. The USB PD EP 310 may return a response to the vendor defined message including an indication of the alternate modes supported by USB port 300. The USB PD EP 310 may then receive a vendor defined message requesting the USB PD EP 310 to enter an alternate mode such as a mode transmitting data using PCIe protocol. The USB port 300 can then receive data using a USB 2.0 protocol at the USB 2.0 billboard device 304 via data lanes 218. In some examples, the USB port 300 may generate an error indicating that the USB port 300 does not support data transmission using the PCIe protocol. Alternatively, the USB port 300 can receive data transmitted with a PCIe protocol at the PCIe controller end point 308 via data lanes 214. The USB port 300 can also detect signals transmitted to the sideband consolidation logic 306 through data lanes 208. In some embodiments, the sideband consolidation logic 306 can also forward the signals to the PCIe controller root port 308 through data lanes 226. In some examples, the signals can include the PERST#, CLKREQ#, and WAKE# signals from the host computing device. The USB port 300 can also receive power from the VBUS signal 312.

It is to be understood that the block diagram of FIG. 3 is not intended to indicate that the USB port 300 is to include all of the components shown in FIG. 3. Rather, the USB port 300 can include fewer or additional components not illustrated in FIG. 3 (e.g., additional memory components, embedded controllers, additional modules, etc.).

Figure 4:
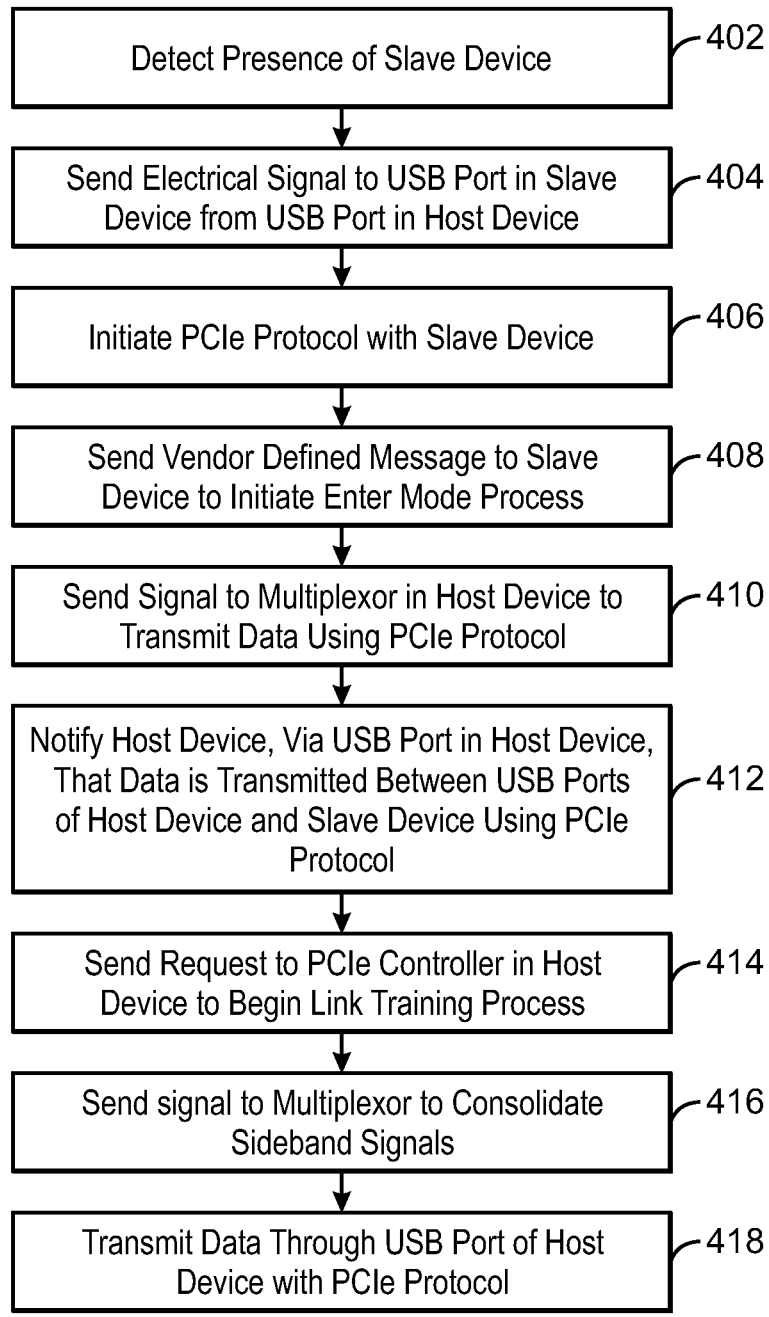
FIG. 4 illustrates a process flow diagram for transmitting data using a PCIe protocol via a USB port.

FIG. 4 illustrates a process flow diagram for transmitting data using a PCIe protocol via a USB port. The method 400 illustrated in FIG. 4 can be implemented with any suitable computing component or device, such as computing device 100 of FIG. 1, or USB port 300 of FIG. 3.

At block 402, the USB PD 124 can detect a presence of a slave device in response to the slave device being coupled to the host. In some embodiments, a slave device can be coupled to a host device comprising USB PD 124 using any suitable cable and any suitable port or receptacle such as a Type-C port or receptacle. In some examples, the slave device can be PCIe compatible. The USB PD 124 can detect the presence of the device by detecting an electrical signal transmitted via pins, such as configuration channel pins, in a connector coupled to a receptacle. In some embodiments, the configuration channel pins can establish and manage downstream facing port in a host device (also referred to herein as DFP) to upstream facing port in a slave device (also referred to herein as UFP) connections. In some embodiments, the configuration pins can indicate an orientation of a cable that couples the host device to a slave device. For example, the cable may transmit data from the slave device to the host device either upside-up or upside-down. Accordingly, the configuration pins can detect the orientation of the cable and transmit data between the host device and the slave device in the appropriate orientation.

At block 404, the USB PD 124 can send an electrical signal to pins in the USB port of a slave device from the USB port of a host device. For example, the USB PD 124 can send a five volt signal, or any other suitable signal that complies with a USB specification to pins, such as a VBUS pin and a VCONN pin, that are included in the USB port of the slave device. The VBUS pin and the VCONN pin can provide power to the USB port of the slave device. In some examples, the USB PD 124 monitors the VCONN pin for electrical resistance to detect if a USB port of a slave device is receiving the electrical signal. The electrical resistance can be within any suitable range such as 800 ohms to 1200 ohms. In some embodiments, the VBUS pin can implement any suitable source current from the USB PD 124 to the coupled device.

In some examples, the USB PD 124 can transmit signals and data to a slave device or coupled device using various pin arrangements in a USB cable. For example, a USB cable connecting the USB PD 124 to a coupled device can transmit data with the two pin arrangements illustrated below in Table 1 A and 1 B, among others.

TABLE 1A

| Pin | Description (for receptacle) | PCIe function (For device) |
| --- | --- | --- |
| A1 | Ground return | Ground |
| A2 | Positive half of first superspeed TX differential pair | RX+ |
| A3 | Negative half of first superspeed TX differential pair | RX− |
| A4 | VBUS | |
| A5 | CC1 | |
| A6 | Dp1 | USB2.0 Billboard device |
| A7 | Dn1 | USB2.0 Billboard device |
| A8 | Sideband Use | Sideband RX |
| A9 | VBUS | |
| A10 | Positive half of first superspeed TX differential pair | SS-USB |
| A11 | Negative half of first superspeed TX differential pair | SS-USB |
| A12 | Ground Return | Ground |
| B1 | Ground Return | Ground |
| B2 | Positive half of second superspeed RX differential pair | SS-USB |
| B3 | Negative half of second | SS-USB |

TABLE 1A-continued

| Pin | Description (for receptacle) | PCIe function (For device) |
|---|---|---|
| | superspeed RX differential pair | |
| B4 | VBUS | |
| B5 | CC2 | |
| B6 | Dp2 | USB2.0 Billboard device |
| B7 | Dn2 | USB2.0 Billboard device |
| B8 | Sideband Use | Sideband TX |
| B9 | VBUS | |
| B10 | Negative half of first superspeed RX differential pair | TX− |
| B11 | Positive half of first superspeed RX differential pair | TX+ |
| B12 | Ground Return | Ground |

TABLE 1B

| Pin | Description | PCIe function |
|---|---|---|
| A1 | Ground return | Ground |
| A2 | Positive half of first superspeed TX differential pair | SS-USB |
| A3 | Negative half of first superspeed TX differential pair | SS-USB |
| A4 | VBUS | |
| A5 | CC1 | |
| A6 | Dp1 | USB2.0 Billboard device |
| A7 | Dn1 | USB2.0 Billboard device |
| A8 | Sideband Use | Sideband RX |
| A9 | VBUS | |
| A10 | Positive half of first superspeed TX differential pair | RX+ |
| A11 | Negative half of first superspeed TX differential pair | RX− |
| A12 | Ground Return | Ground |
| B1 | Ground Return | Ground |
| B2 | Positive half of second superspeed RX differential pair | TX+ |
| B3 | Negative half of second superspeed RX differential pair | TX− |
| B4 | VBUS | |
| B5 | CC2 | |
| B6 | Dp2 | USB2.0 Billboard device |
| B7 | Dn2 | USB2.0 Billboard device |
| B8 | Sideband Use | Sideband TX |
| B9 | VBUS | |
| B10 | Negative half of first superspeed RX differential pair | SS-USB |
| B11 | Positive half of first superspeed RX differential pair | SS-USB |
| B12 | Ground Return | Ground |

In Tables 1A and 1 B, the pins described as "Dp1," "Dn1," "Dp2," and "Dn2" can be used to transmit data using a USB 2.0 protocol. Also, the term "SS-USB" can indicate data transmissions though USB ports that support USB 3.0. Additionally, the term "TX" refers to data transmission and the term "RX" refers to data reception.

At block 406, the USB PD 124 can initiate a PCIe protocol with the coupled device. In some embodiments, the USB PD 124 can initiate the PCIe protocol by communicating a vendor mode with the coupled device. For example, the USB PD 124 can send a vendor defined message to the coupled device to discover vendor identifiers or VIDs. In some embodiments, the vendor identifiers indicate a vendor or manufacturer of the coupled device using an identifier of any suitable number of bits. In some examples, the coupled device responds to the vendor defined message with the vendor identifier for the coupled device. For example, the coupled device may respond with a vendor identifier of "h8087" in hexadecimal or any other suitable identifier that indicates that the vendor of the coupled device. The USB PD 124 can then send a second vendor defined message to discover alternate modes or interfaces supported by the coupled device. For example, the alternate modes or interfaces can include PCIe, or Display Port, etc. In some examples, the coupled device can respond to the vendor defined message indicating that the coupled device supports data transmission using the PCIe protocol.

A vendor defined message, in some examples, can include requests for data in accordance with Table 2 below. The values in Table 2 are included in a hexadecimal format.

TABLE 2

Structured VDM Header

| Bit(s) | Description | Values |
|---|---|---|
| 4:0 | Command | 0h = RESERVED, may not be used. |
| | | 1h = Discover Identity. |
| | | 2h = Discover SVIDs. |
| | | 3h = Discover Modes. |
| | | 4h = Enter Mode. |
| | | 5h = Exit Mode. |
| | | 6h = Attention. |
| | | 7h-Fh = RESERVED, may not be used. |
| | | 10h = PCIe Configure. |
| | | 11h-1Fh = RESERVED for PCIE_SID use. |
| 5 | RESERVED | RESERVED (always 0) |
| 7:6 | Command Type Initiator shall clear to 0 | 00 = Initiator. |
| | | 01 = Responder ACK. |
| | | 10 = Responder NAK. |
| | | 11 = Responder BUSY. |
| 10:8 | Object Position | 000 = RESERVED. |
| | | 001-110 = Index into the list of Vendor Defined |

TABLE 2-continued

Structured VDM Header

| Bit(s) | Description | Values |
|---|---|---|
| | | Objects (VDOs) to identify the desired Mode VDO. 111 = Exit all Modes (equivalent of a power-on reset). May not be used with the Enter Mode command |
| 12:11 | RESERVED | RESERVED(always 0) |
| 14:13 | Structured VDM Version | 00 = Version 1.0 Other values are RESERVED |
| 15 | VDM Type | 1 = Structured VDM |
| 31:16 | Standard or Vendor ID | Base SID (for Discover SVIDs command) or PCIE_SID |

As discussed above, a vendor identification (VID), as referred to herein, can include a value assigned by the USB-IF specification to identify a vendor. In some examples, the VID can be a sixteen bit value. A standard identifier (also referred to herein as SID) can include a value, such as a 16 bit value, among others, that is assigned by a universal serial bus in accordance with a USB specification that identifies an industry standard. A standard video identification (also referred to herein as SVID) can be a reference to either a SID or a VID.

In some examples, a vendor defined message can also include data responding to a request, in which the vendor defined message indicates vendor specifications, such as link configuration, pin assignment, and role reversal support, among others, in accordance with Table 3 below.

TABLE 3

Discover Modes Response

| Bit(s) | Description | Values |
|---|---|---|
| 1:0 | Link configuration | 00 = Reserved 01 = Supports x2 PCIe link 10 = Supports x1 PCIe and no SS-USB 11 = Supports x1 PCIe and 1 SS-USB port |
| 3:2 | Pin assignments | 00 = As per PCIe training. Valid if "Link Configuration" is 01b, i.e. supports lane reversal. 01 = Pin Assignment A 10 = Pin Assignment B 11 = Reserved In case where 1 SS-USB is supported, the high speed pins left unused after using the pins used by PCIe, can be used for the SS-USB connection |
| 4 | Role Reversal | 0 = Role Reversal not supported 1 = Role Reversal supported, i.e. the device can act as either an upstream port or a downstream port. |
| 31:5 | Reserved | 0 |

At block 408, the USB PD 124 can send a vendor defined message to the coupled device to initiate an enter mode process. The enter mode process can include sending a vendor defined message, such as a PCIe configure command, to the coupled device to enter an alternate mode or interface. For example, the vendor defined message can request that the coupled device enter an alternate mode in which data is transmitted using a data protocol, such as PCIe. In response to the vendor defined message, the USB PD 124 may monitor and detect an acknowledgment from the coupled device that indicates that the coupled device is transmitting data using the alternate mode or interface. In some examples, the vendor defined message for a PCIe command requesting initiation of an enter mode process can include data based on Table 4 below.

TABLE 4

Configure PCIe Command

| Bit(s) | Description | Values |
|---|---|---|
| 1:0 | Link Configuration | 00 = Reserved 01 = x2 PCIe link 10 = x1 PCIe and no SS-USB 11 = x1 PCIe and 1 SS-USB port |
| 3:2 | Pin Assignment | 00 = As per PCIe training. Valid if "Link configuration" is 01b. 01 = Use Pin assignment A 10 = Use Pin assignment B 11 = Reserved In case where 1 SS-USB is supported, the high speed pins left unused after using the pins for PCIe, can be used for the SS-USB connection |
| 4 | Role Reversal | 0: No Role Reversal 1: Enter Role Reversal, (e.g. The plugged in device acts as a downstream port, and the system acts as an upstream port from PCIe perspective.) |
| 31:5 | Reserved | 0 |

In some embodiments, the USB PD 124 can send a PCIe configure command to the multiplexor in response to receiving a programmable instruction, in response to embedded logic, or in response to a runtime process. For example, the USB PD 124 can detect that the multiplexor is to detect data from a coupled device, wherein the data is transmitted using the PCIe protocol.

At block 410, the USB PD 124 can send a signal to a multiplexor in the USB port 122 to transmit data using a PCIe protocol. As discussed above in relation to FIG. 2, the USB PD 124 can send a signal to the multiplexor to transmit data to a PCIe controller rather than an xHCI host controller when data is transmitted using a PCIe protocol. At block 412, the USB PD 124 can notify the host computing device, in which the USB PD 124 resides, that data transmitted between the host computing device and the coupled device is to be transmitted using the PCIe protocol. For example, the USB PD 124 may receive data from any suitable hardware component, application, or logic in the host computing device and transmit the received data to a slave computing device coupled to the USB port 122 using a PCIe protocol.

At block 414, the USB PD 124 can send a request to a PCIe controller to begin a link training process. In some embodiments, the link training process can include implementing the PCIe Link Training and Status State Machine rules. At block 416, the USB PD 124 can send a request to the multiplexor indicating that the sideband signals are to be consolidated on sideband channels or SBU pins using a serial sideband link protocol. In some embodiments, the sideband channels can transmit consolidated signals such as the PERST# signal, the WAKE# signal, the CLKREQ# signal, and the buffer flush/fill signal, among others.

At block 418, the USB PD 124 can transmit data through the USB port using a PCIe protocol. In some embodiments, the USB PD 124 can continue transmitting data using a PCIe protocol until the USB PD 124 receives a vendor defined message requesting an exit mode, a cable connecting the host computing device to the coupled device is removed, or the USB PD 124 receives a hard reset signal. If the USB PD 124 stops transmitting data using a PCIe protocol, the USB PD can initiate an exit mode that results in data transmission using any suitable USB protocol rather than a PCIe protocol. In some embodiments, the USB PD 124 can indicate that data is to be transmitted with a coupled device using a USB 2.0 protocol in response to receiving a negative acknowledgment or NAK from the coupled device.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the USB PD 124 can detect support for a role reversal mode, which can be used in cases where a host system can be controlled by the device coupled to the USB port. In some embodiments, role reversal can be used for debugging purposes and troubleshooting applications, and the like. In some embodiments, if Role Reversal is supported by the USB PD 124 and the device coupled to the USB receptacle 122, the USB PD 124 can send an alert to software in a host device indicating that a role reversal option is available.

Furthermore, the USB PD 124 can generate an error in response to detecting the data from the slave device or PCIe compliant device is transmitted using a protocol not supported by the USB PD 124. In some examples, isolation circuitry can be included in the USB port 122 and the isolation circuitry can generate the error.

Moreover, the USB PD 124 may also search a response to a vendor defined message from a slave device for an SVID. As discussed above, an SVID can indicate a vendor identifier or standard identifier for a slave device. In some examples, a slave device connected to a USB port might support more than one SVID. In that case, the slave device may present the SVID in any arbitrary order, and the USB PD 124 can search the response to discover the PCIE_SID or the identifier associated with PCIe protocol support. An example of a response from a slave device that includes multiple SVIDs is provided below in Table 5.

TABLE 5

| Header Message Length = 1-7 | Vendor Defined Message Header | Vendor Defined Object 1 | | Vendor Defined Object 2 | |
|---|---|---|---|---|---|
| | | SVID-0 (B31-16) | SVID-1 (B15-0) | SVID-2 (B31-16) | 0x0000 (B15-0) |

EXAMPLE 1

An apparatus that can transmit data through a USB port using PCIe protocol is described herein. The apparatus can include a multiplexor, and logic to detect a coupling of the apparatus and a PCIe compatible device via a Type-C connector and send at least one vendor defined message to the PCIe compatible device. The logic can also receive a vendor identification and an alternate mode indicator corresponding to a data transfer via a PCIe protocol and send an enter mode command to the PCIe compatible device to enable the data transfer between the apparatus and the PCIe compatible device via the PCIe protocol. Furthermore, the logic can transfer data between the apparatus and the PCIe compatible device via the Type-C connector with the PCIe protocol.

In some embodiments, the logic can detect support for role reversal. Alternatively, or in addition, the logic can send the alternate mode indicator to an application or hardware component of the apparatus to indicate that the apparatus is to transmit data to the PCIe compatible device using a PCIe protocol. Alternatively, or in addition, the apparatus can include an xHCI Host controller, and the logic can control the multiplexor to transmit data via the PCIe protocol or a USB protocol. Alternatively, or in addition, the multiplexor can include sideband logic. Alternatively, or in addition, the logic can send a PCIe configure command to the multiplexor. Alternatively, or in addition, the alternate mode indicator can indicate whether the PCIe compliant device is configured to transmit data using the PCIe protocol. Alternatively, or in addition, the logic can send the PCIe configure command to the multiplexor in response to receiving a programmable instruction, in response to embedded logic, or in response to a runtime process. Alternatively, or in addition, the logic can include isolation circuitry to generate an error in response to detecting the data from the PCIe compliant device is transmitted using a protocol not supported by the logic.

EXAMPLE 2

A method for transmitting data via a USB port is also described herein. The method can include detecting a coupling of an apparatus and a PCIe compatible device via a Type-C connector and sending at least one vendor defined message to the PCIe compatible device. The method can also include receiving an alternate mode indicator corresponding to a data transfer via a PCIe protocol and sending an enter mode command to the PCIe compatible device to enable the data transfer between the apparatus and the PCIe compatible device via the PCIe protocol. Furthermore, the method can include transferring data between the apparatus and the PCIe compatible device via the Type-C connector with the PCIe protocol.

In some embodiments, the method includes detecting support for role reversal. Alternatively, or in addition, the method can include sending the alternate mode indicator to an application or hardware component of the apparatus to indicate that the apparatus is to transmit data to the PCIe compatible device using a PCIe protocol. Alternatively, or in addition, the method can include controlling a multiplexor to transmit data via a PCIe protocol or a USB protocol. Alternatively, or in addition, the method can include sending a PCIe configure command to the multiplexor. Alternatively, or in addition, the alternate mode indicator can indicate whether the PCIe compliant device is configured to transmit data using the PCIe protocol. Alternatively, or in addition, the method can include sending the PCIe configure command to a multiplexor in response to receiving a programmable instruction, in response to embedded logic, or in response to a runtime process. Alternatively, or in addition, the method can include generating an error in response to detecting the data from the PCIe compliant device is transmitted using a protocol not supported by the logic

EXAMPLE 3

A system for transmitting data is described herein. The system includes logic to detect a coupling of the apparatus and a serial expansion bus compatible device via a multimode connector and send at least one vendor defined message to the serial expansion bus compatible device. The logic can also receive an alternate mode indicator corresponding to a data transfer via a serial expansion bus protocol and send an enter mode command to the serial expansion bus compatible device to enable the data transfer between the apparatus and the serial expansion bus compatible device via the serial expansion bus protocol. Additionally, the logic can transfer data between the apparatus and the serial expansion bus compatible device via the multimode connector with the serial expansion bus protocol.

In some embodiments, the logic can detect support for role reversal. Alternatively, or in addition, the logic can send the alternate mode indicator to an application or hardware component of the apparatus to indicate that the apparatus is to transmit data to the serial expansion bus compatible device using a serial expansion bus protocol. Alternatively, or in addition, the apparatus can include an xHCI Host controller, and the logic can control the multiplexor to transmit data via the serial expansion bus protocol or a USB protocol. Alternatively, or in addition, the multiplexor can include sideband logic. Alternatively, or in addition, the logic can send a serial expansion bus configure command to the multiplexor. Alternatively, or in addition, the alternate mode indicator can indicate whether the serial expansion bus compliant device is configured to transmit data using the serial expansion bus protocol. Alternatively, or in addition, the logic can send the serial expansion bus configure command to the multiplexor in response to receiving a programmable instruction, in response to embedded logic, or in response to a runtime process. Alternatively, or in addition, the logic can include isolation circuitry to generate an error in response to detecting the data from the serial expansion bus compliant device is transmitted using a protocol not supported by the logic.

EXAMPLE 4

An apparatus that can transmit data through a USB port using PCIe protocol is described herein. The apparatus can include a multiplexor, and logic comprising means for detecting a coupling of the apparatus and a PCIe compatible device via a Type-C connector and means for sending at least one vendor defined message to the PCIe compatible device. The logic also comprises means for receiving a vendor identification and an alternate mode indicator corresponding to a data transfer via a PCIe protocol and means for sending an enter mode command to the PCIe compatible device to enable the data transfer between the apparatus and the PCIe compatible device via the PCIe protocol. Furthermore, the logic comprises means for transferring data between the apparatus and the PCIe compatible device via the Type-C connector with the PCIe protocol.

In some embodiments, the logic comprises means for detecting support for role reversal. Alternatively, or in addition, the logic comprises means for sending the alternate mode indicator to an application or hardware component of the apparatus to indicate that the apparatus is to transmit data to the PCIe compatible device using a PCIe protocol. Alternatively, or in addition, the apparatus can include an xHCI Host controller, and the logic can comprise means for controlling the multiplexor to transmit data via the PCIe protocol or a USB protocol. Alternatively, or in addition, the multiplexor can include sideband logic. Alternatively, or in addition, the logic comprises means for sending a PCIe configure command to the multiplexor. Alternatively, or in addition, the alternate mode indicator can indicate whether the PCIe compliant device is configured to transmit data using the PCIe protocol. Alternatively, or in addition, the logic comprises means for sending the PCIe configure command to the multiplexor in response to receiving a programmable instruction, in response to embedded logic, or in response to a runtime process. Alternatively, or in addition, the logic can include isolation circuitry to generate an error in response to detecting the data from the PCIe compliant device is transmitted using a protocol not supported by the logic.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus comprising:
a multiplexor; and
logic to:
detect a coupling of the apparatus and a PCIe compatible device via a Type-C connector;
detect support for role reversal;
send at least one vendor defined message to the PCIe compatible device;
receive a vendor identification and an alternate mode indicator corresponding to a data transfer via a PCIe protocol;
send an enter mode command to the PCIe compatible device to enable the data transfer between the apparatus and the PCIe compatible device via the PCIe protocol; and
transfer data between the apparatus and the PCIe compatible device via the Type-C connector with the PCIe protocol.

2. The apparatus of claim 1, wherein the logic is to send the alternate mode indicator to an application or hardware component of the apparatus to indicate that the apparatus is to transmit data to the PCIe compatible device using a PCIe protocol.

3. The apparatus of claim 1, further comprising an xHCI Host controller, and wherein the logic is to control the multiplexor to transmit data via the PCIe protocol or a USB protocol.

4. The apparatus of claim 3, wherein the alternate mode indicator indicates whether the PCIe compliant device is configured to transmit data using the PCIe protocol.

5. The apparatus of claim 1, wherein the multiplexor includes sideband logic.

6. The apparatus of claim 1, wherein the logic sends a PCIe configure command to the multiplexor.

7. The apparatus of claim 6, wherein the logic is to send the PCIe configure command to the multiplexor in response to receiving a programmable instruction, in response to embedded logic, or in response to a runtime process.

8. The apparatus of claim 1, wherein the logic comprises isolation circuitry to generate an error in response to detecting the data from the PCIe compliant device is transmitted using a protocol not supported by the logic.

9. A method for transmitting data via a USB port, the method comprising:
detecting a coupling of an apparatus and a PCIe compatible device via a Type-C connector;
detecting support for role reversal;
sending at least one vendor defined message to the PCIe compatible device;
receiving an alternate mode indicator corresponding to a data transfer via a PCIe protocol;
sending an enter mode command to the PCIe compatible device to enable the data transfer between the apparatus and the PCIe compatible device via the PCIe protocol; and
transferring data between the apparatus and the PCIe compatible device via the Type-C connector with the PCIe protocol.

10. The method of claim 9, comprising sending the alternate mode indicator to an application or hardware component of the apparatus to indicate that the apparatus is to transmit data to the PCIe compatible device using a PCIe protocol.

11. The method of claim 10, wherein the alternate mode indicator indicates whether the PCIe compliant device is configured to transmit data using the PCIe protocol.

12. The method of claim 9, comprising controlling a multiplexor to transmit data via the PCIe protocol or a USB protocol.

13. The method of claim 12, comprising sending a PCIe configure command to the multiplexor.

14. The method of claim 12, comprising sending the PCIe configure command to the multiplexor in response to receiving a programmable instruction, in response to embedded logic, or in response to a runtime process.

15. The method of claim 9, comprising generating an error in response to detecting the data from the PCIe compliant device is transmitted using a protocol not supported by the logic.

16. An apparatus for transmitting data comprising:
logic to:
detect a coupling of the apparatus and a serial expansion bus compatible device via a multi-mode connector;
detect support for role reversal;
send at least one vendor defined message to the serial expansion bus compatible device;
receive an alternate mode indicator corresponding to a data transfer via a serial expansion bus protocol;
send an enter mode command to the serial expansion bus compatible device to enable the data transfer between the apparatus and the serial expansion bus compatible device via the serial expansion bus protocol; and
transfer data between the apparatus and the serial expansion bus compatible device via the multi-mode connector with the serial expansion bus protocol.

17. The apparatus of claim 16, comprising a multiplexor and sideband logic.

18. The apparatus of claim 17, wherein the logic is to send a serial expansion bus configure command to the multiplexor in response to receiving a programmable instruction, in response to embedded logic, or in response to a runtime process.

19. The apparatus of claim 16, wherein the logic comprises isolation circuitry to generate an error in response to detecting the data from the serial expansion bus compliant device is transmitted using a protocol not supported by the logic.

* * * * *